(12) United States Patent
Ajemian (10) Patent No.: US 9,327,224 B2
(45) Date of Patent: May 3, 2016

(54) MECHANICAL FILTER-BASED POLLUTION CONTROL SYSTEM TO REMEDIATE COOKING EMISSIONS

(71) Applicant: Robert C. Ajemian, Sparta, NJ (US)

(72) Inventor: Robert C. Ajemian, Sparta, NJ (US)

( * ) Notice: Subject to any disclaimer, the term of this patent is extended or adjusted under 35 U.S.C. 154(b) by 157 days.

(21) Appl. No.: 14/287,632

(22) Filed: May 27, 2014

(65) Prior Publication Data

US 2014/0348711 A1 Nov. 27, 2014

Related U.S. Application Data

(60) Provisional application No. 61/827,191, filed on May 24, 2013.

(51) Int. Cl.
*B01D 46/00* (2006.01)
*B01D 50/00* (2006.01)
*B01D 53/75* (2006.01)
*B01D 53/78* (2006.01)
*B01D 53/00* (2006.01)

(52) U.S. Cl.
CPC ........ *B01D 46/0023* (2013.01); *B01D 46/0036* (2013.01); *B01D 46/0082* (2013.01); *B01D 50/008* (2013.01); *B01D 53/75* (2013.01); *B01D 53/78* (2013.01); *B01D 53/002* (2013.01); *B01D 2251/104* (2013.01); *B01D 2258/0275* (2013.01)

(58) Field of Classification Search
CPC .. B01D 46/0023; B01D 53/76; B01D 53/002; B01D 46/0082; B01D 46/0036; B01D 53/44
USPC .................... 96/132, 134, 363, 233; 422/123
See application file for complete search history.

(56) References Cited

U.S. PATENT DOCUMENTS

| | | | |
|---|---|---|---|
| 3,242,652 A | 3/1966 | Malenchini | |
| 3,785,124 A | 1/1974 | Gaylord | |
| 4,084,947 A | 4/1978 | Ear | |
| 4,323,373 A | 4/1982 | Fritz | |
| 5,472,342 A | 12/1995 | Welsh, II et al. | |
| 7,614,396 B2 | 11/2009 | So | |
| 2007/0240742 A1 | 10/2007 | Kwok et al. | |
| 2009/0042500 A1* | 2/2009 | Robison | A61L 9/20 454/67 |
| 2012/0138478 A1 | 6/2012 | Yost, III et al. | |
| 2012/0247074 A1 | 10/2012 | Chmayssani et al. | |
| 2012/0317940 A1 | 12/2012 | Ball et al. | |

FOREIGN PATENT DOCUMENTS

EP 0857508 A1 8/1998

* cited by examiner

*Primary Examiner* — Sean E Conley
(74) *Attorney, Agent, or Firm* — Matthew J. Lattig; Charter IP, LLC (57) ABSTRACT

A mechanical filter-based air pollution control system for removing particle and gas phase pollutants in a waste airstream exhausted from commercial cooking operations is described, which includes a housing enclosing at least three filter stages to remove particle and gas pollutants in the airstream. The example system may include a fogger assembly that sprays fog droplets into the waste airstream to condense a portion of gas phase pollutants into condensed particles, a wash mechanism including spray nozzles to wash surfaces of the first stage filter to remove grease therefrom, and injection means for injecting activated ozone, which comprises ozone with a surplus of hydroxyl radicals, into the housing to initiate advanced oxidation processes (AOPs) to decompose particle and gas phase pollutants within the waste airstream in the filters. Where activated ozone is employed, the system includes a fourth stage filter that adsorbs and retains gas phase pollutants for subsequent oxidation.

20 Claims, 7 Drawing Sheets

MECHANICAL FILTER-BASED POLLUTION CONTROL SYSTEM TO REMEDIATE COOKING EMISSIONS

CROSS-REFERENCE TO RELATED APPLICATION

The present application claims the benefit under 35 U.S.C. §119(e) of U.S. Provisional Patent Application No. 61/827,191 to the inventor, filed May 24, 2013, the entire contents of which is hereby incorporated by reference herein.

BACKGROUND

1. Field

Example embodiments in general relate to a mechanical filter-based pollution control system to remediate cooking emissions.

2. Related Art

The emission profile from commercial cooking operations has been well studied and shown to consist of particles (aerosols), semi-volatile organic compounds (sVOCs), volatile organic compounds (VOCs) and inorganic volatile species. The particles give rise to visual smoke and the VOCs give rise to odors.

The mass, size distribution and organic chemistry profile of the emissions can vary widely and are functions primarily of the type of cooking apparatus and the chemical and structural composition of the raw food being cooked. The most severe challenge to cooking emission remediation has been demonstrated repeatedly to be the emissions generated by gas char broiling of ground beef patties, with the severity of emissions being proportionately related to the fat content and the degree of well doneness of the beef patties. Of particular note is that the aerosol and chemical profiles of char broiled ground beef have been characterized and shown to not be dissimilar from the emission profile of diesel exhaust. Of particular concern are the National Ambient Air Quality Standards (NAAQS) and EPA Title V air toxics that are released. These include but are not limited to: PM2.5, PAH (poly aromatic hydrocarbons), butadienes, other toxic VOCs and ozone precursors. Indeed, air quality management districts in California are currently in the process of generating cooking emission remediation standards for charbroiling of beef, and the Bay Area Air Quality Management District (BAAQMD) has already promulgated such regulations.

Historically and currently, there are two established ways of remediating the particulate (aerosol) cooking emissions: removal from the airstream by electrostatic deposition onto alternatively charged plates or mechanical removal of the aerosols by passing the airstream through a series of progressively more efficient media filters. Established known mechanical filtration properties include impaction, interception, and interference.

Both technologies have been proven to be highly effective and there are advantages to choosing one over the other. The two main advantages of electrostatic precipitators have been first, that the pressure drop through the filters is 50-75% less than through clean mechanical filters, with that difference becoming more pronounced as the mechanical filters load. For an electrostatic precipitator the pressure drop remains constant, whereas, as mechanical filters load, the resistance to airflow increases, thus decreasing the total air that can be exhausted in the kitchen hood. This is a concern for modern day low flow hoods. This condition often mandates a constant flow control system and/or filter change warning mechanisms. Second is that the electrostatic precipitators can be programmed for nightly washing, thus removing the grease from the duct pathway and decreasing the risk of fire presented by accumulated grease in the ducted system.

Mechanical filtration control devices are often favored because they typically cost less and are more fail-safe in that electrical components are not required for proper functioning. Mechanical filters are also easier to service because highly trained technicians are not required for routing maintenance. These mechanical systems typically have three stages of progressively more efficient filters with the three stages typically in the range (all efficiencies in MERV ratings):

1. STAGE 1—MERV 6-10,
2. STAGE 2—MERV 12-15, and
3. STAGE 3—(95-99) DOP up to HEPA (99.97) DOP, wherein the numbers in parentheses represent percentage of 0.3 micrometer particles removed.

A well established mode exists at 0.2 micrometer diameter aerosols for char broiling beef, so the stage 3 filters are mandatory. These filters are expensive so the correct selection of the workhorse filters of stage 1 and stage 2 are paramount. The frequency of filter changing varies with the cooking load; however, the optimal scenario would be a month's duration for stages 1 and 2 and a quarterly duration for stage 3.

For both types of particulate control technologies, neither one significantly effects the removal of sVOCs or VOCs. This emissions component is either ignored, or more often (especially when cooking odor abatement is desired) removed by adsorption (with varying success) by a sorbent such as activated charcoal.

SUMMARY OF THE INVENTION

An example embodiment of the present invention is directed to a mechanical filter-based air pollution control system for removing particle and gas phase pollutants in a waste airstream exhausted from commercial cooking operations. The system includes a housing having an inlet and an outlet, an exhaust fan attached to the outlet for drawing the waste airstream into the inlet and through the housing to the outlet and discharged to the outside atmosphere, and a fogger assembly arranged within the housing at the inlet and connected to a cold water source for spraying equal-sized 1 micrometer droplets to mix with the incoming waste airstream so as to achieve psychrometric saturation of the waste airstream, evaporative cooling of the airstream, and condensation of a portion of gas phase pollutants in the waste airstream into condensed particles. The system includes a first stage metal filter arranged within the housing and downstream of the fogger assembly for filtering particle pollutants, and solubilizing and removing, by drainage, polar particle and gas phase pollutants in the waste airstream, a second stage filter arranged within the housing and downstream of the first stage filter, the second stage filter including a wool layer attached to a MERV 15 synthetic media therein for removing particles, including the condensed particles, and gas phase pollutants remaining in the waste airstream after passing through the first stage filter, and a third stage filter arranged within the housing and downstream of the second stage filter, the third stage filter including an oil-mist media therein for removing sub-micron particle including the condensed particle pollutants remaining in the waste airstream after passing through the second stage filter.

Another example embodiment is directed to a mechanical filter-based air pollution control system for removing particle and gas phase pollutants in a waste airstream exhausted from commercial cooking operations. The system includes a housing having an inlet and an outlet, an exhaust fan attached to the outlet for drawing the waste airstream into the inlet and through the housing to the outlet, a disposable, synthetic first stage filter with an efficiency rating of MERV 6-10 for filtering particles in the waste airstream, a second stage filter arranged within the housing and downstream of the first stage filter, the second stage filter including a wool layer attached to a MERV 15 synthetic media therein for removing particle and gas phase pollutants remaining in the waste airstream after passing through the first stage filter, and a third stage filter arranged within the housing and downstream of the second stage filter, the third stage filter including an oil-mist media therein for removing particle pollutants remaining in the waste airstream after passing through the second stage filter. The system further includes a fourth stage filter arranged within the housing and downstream of the third stage filter for removing, by adsorption, sub-micron particle and gas phase pollutants remaining in the waste airstream after passing through the third stage filter, and injection means to inject activated ozone, which comprises ozone with a surplus of hydroxyl radicals, within the housing to initiate advanced oxidation processes (AOPs) upon contact of the activated ozone with the waste airstream so as to decompose particle and gas phase pollutants within the waste airstream and retained in the first through fourth stage filters. The fourth stage filter quenches any fugitive or unused ozone remaining in the system.

Another example embodiment is directed to a mechanical filter-based air pollution control system for removing particle and gas phase pollutants in a waste airstream exhausted from commercial cooking operations. The system includes a housing having an inlet and an outlet, an exhaust fan attached to the outlet for drawing the waste airstream into the inlet and through the housing to the outlet and discharged to the outside atmosphere, and a fogger assembly arranged within the housing at the inlet and connected to a cold water source for spraying fog droplets to mix with the incoming waste airstream so as to condense gas phase pollutants in the airstream to condensed particles. The system includes a first stage metal filter arranged within the housing and downstream of the fogger assembly for filtering particle pollutants, and solubilizing and removing, by drainage, polar particle and gas phase pollutants in the waste airstream, a wash mechanism arranged in the housing in facing relation to a front of the first stage filter, the wash mechanism including a manifold supporting a plurality of spray nozzles thereon, the manifold supplying a mix of heated water from a hot water source and detergent to the nozzles for periodically washing surfaces of the first stage filter to remove grease therefrom, a second stage filter arranged within the housing and downstream of the first stage filter for removing particle and gas phase pollutants remaining in the waste airstream after passing through the first stage filter, and a third stage filter arranged within the housing and downstream of the second stage filter for removing sub-micron particle including condensed particle pollutants remaining in the waste airstream after passing through the second stage filter. The system further includes a fourth stage filter arranged within the housing and downstream of the third stage filter for removing, by adsorption, condensed particles and gas phase pollutants remaining in the waste airstream after passing through the third stage filter, and injection means to inject activated ozone within the housing, which comprises ozone with a surplus of hydroxyl radicals, to initiate advanced oxidation processes (AOPs) upon contact of the activated ozone with the waste airstream so as to decompose particle and gas phase pollutants within the waste airstream and retained in the first through fourth stage filters. The fourth stage filter quenches any fugitive or unused ozone remaining in the system.

BRIEF DESCRIPTION OF THE DRAWINGS

Example embodiments will become more fully understood from the detailed description given herein below and the accompanying drawing, wherein like elements are represented by like reference numerals, which are given by way of illustration only and thus are not limitative of the example embodiments herein.

DETAILED DESCRIPTION

In general, and as to be shown in further detail below, example embodiments are directed to a mechanical filter-based air pollution control system having a washable first stage filter that removes particle pollutants such as grease and smoke, and gaseous odorous pollutants generated within a waste airstream from commercial cooking operations by a commercial kitchen cooking ventilation hood. The pollution control system incorporates novel and advanced chemical and physical technologies either separately or in combination to achieve maximal removal efficiencies of these air pollutants.

As to be shown in more detail hereafter, the system includes a fogger assembly that is combined with a plurality of progressively more efficient filters arranged within the system housing, including a stage 1 reactor filter, a stage 2 combination wool/synthetic media layered filter, and a stage 3 oil-mist media filter that assimilates the characteristics and DOP ratings of a HEPA media filter, in an effort to achieve maximum removal of the total emissions from the waste airstream with minimal ongoing filter replacement cost. The system further includes a wash mechanism provided for cleaning the stage 1 filter, thereby providing frequent and consistent grease removal from the filter, while eliminating the need to frequently replace a disposable type stage I filter. A disposable stage I filter is also available in an alternative example embodiment.

Additionally, what is known as Advanced Oxidation Processes (AOPs) (which initiate when activated ozone (comprising ozone gas with a surplus of hydroxyl radicals (.OH)) is injected into the system to mix with the emissions in the waste airstream) are utilized in combination with a proprietary synthetic hydrophobic zeolite sorbent serving as at least part of an optional stage IV filter of the system, in an effort to achieve maximum removal, retention and subsequent decomposition of the gas phase odorous pollutants from the waste airstream.

Figure 1:
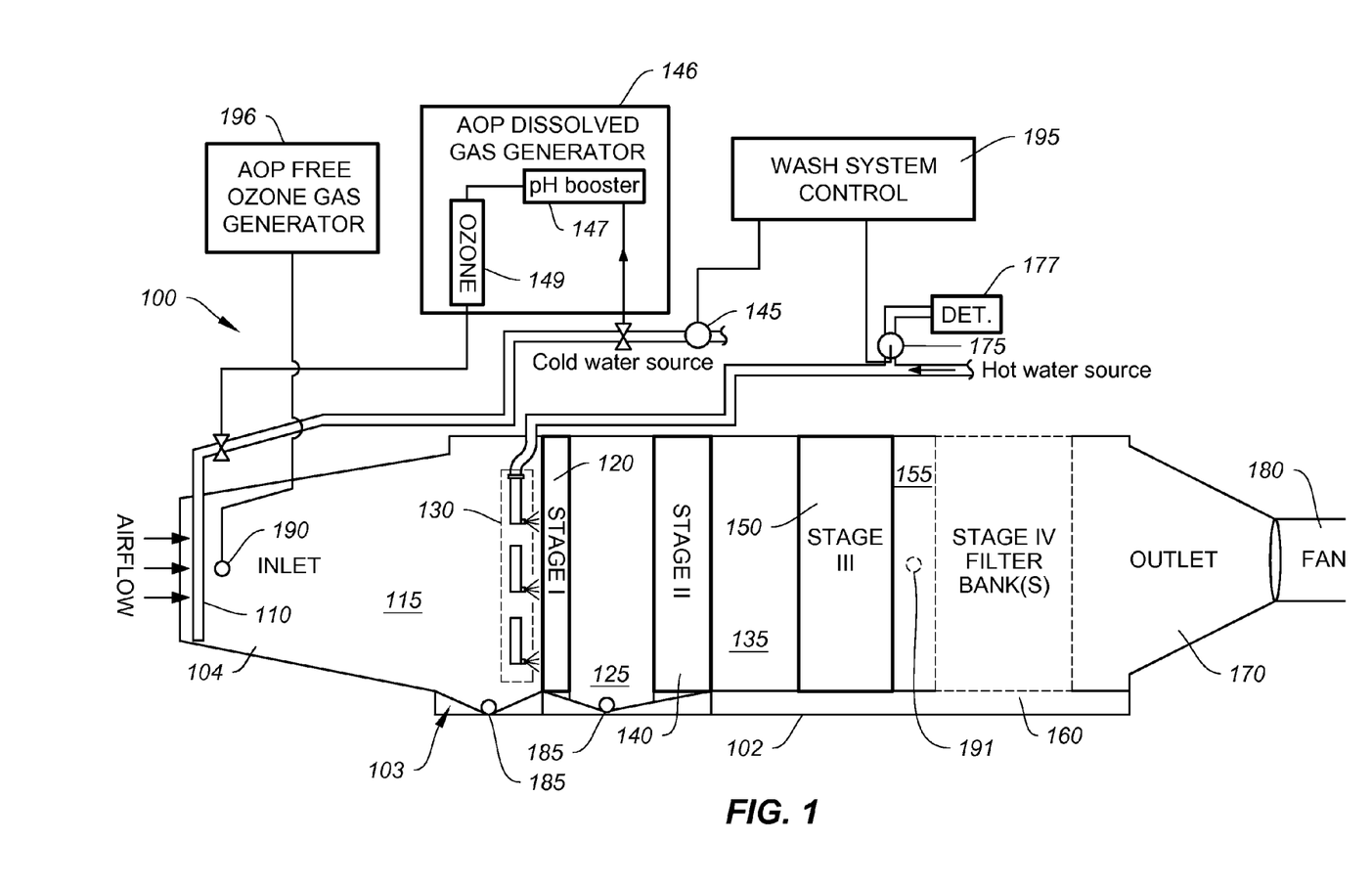
FIG. 1 is a block diagram of a pollution control system according to an example embodiment.
Figures 2, 3:
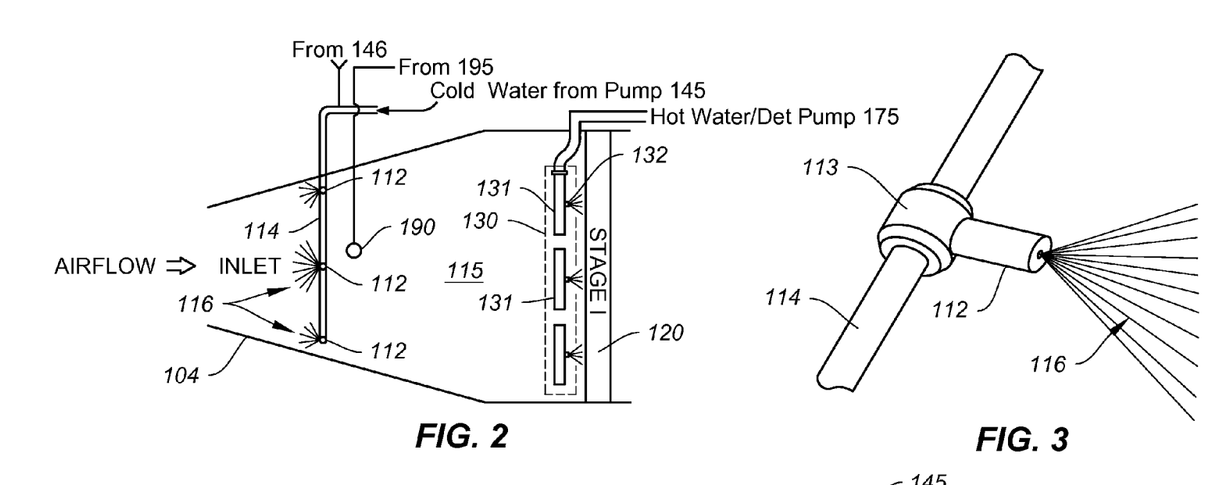
FIG. 2 is a front portional view of part of the pollution control system to show a fogger assembly in more detail.
FIG. 3 is a plan view of an example high pressure nozzle installed on a collar that is positioned on a stainless steel tube according to the example embodiment.
Figure 8:
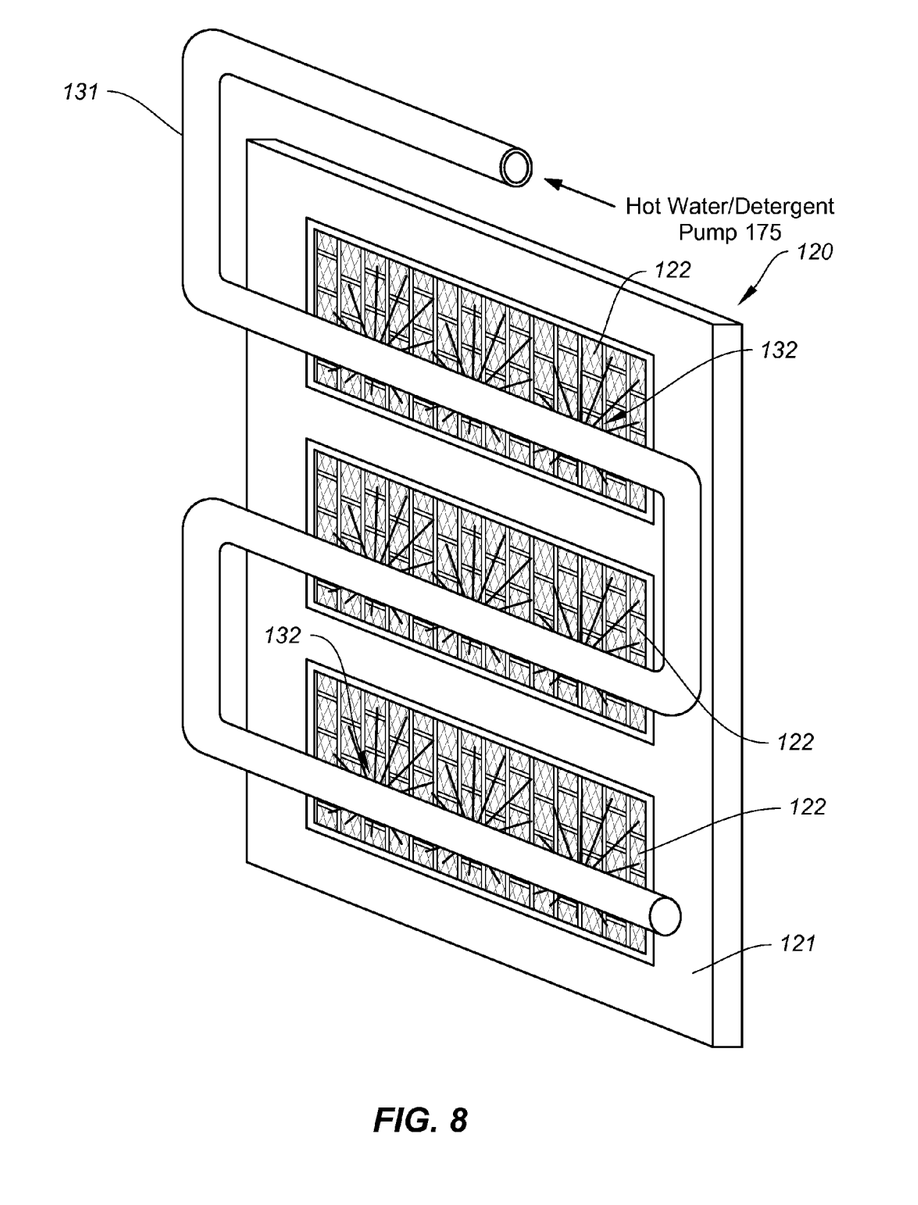
FIG. 8 is a perspective view of the looping manifold and nozzles of the wash mechanism in relation to the first stage filter.

FIG. 1 is a block diagram of a pollution control system according to an example embodiment. As to be set forth more fully below, the example embodiments in general are directed to a mechanical filter-based pollution control system (e.g., no electrostatic filtering) with wash mechanism to remediate cooking emissions such as can be found in the waste airstream emitted from a commercial kitchen cooking ventilation hood (not shown). The mechanical filter-based pollution control system 100 of FIG. 1 features a wash mechanism 130 to effectively clean the first stage of mechanical filtration (stage I filter 120). The first stage filter 120 is selected due to its high efficiency and "wash ability". Thus, one gains the benefit of nightly grease removal combined with a permanent, non-replaceable filter; without the complexity of hi-voltage electronics or easily damaged electrostatic cells.

Salient components of the system 100 include the wash mechanism 130, which is comprised of a looping copper manifold 131 with fixed high pressure wash nozzles 132 (FIGS. 2, 8) to directly wash the stage I filter 120. A continuously running fogger assembly 110 configured to spray monodisperse fog droplets is positioned at the inlet 104 of the system 100 and serves to maximally reduce the temperature of the incoming particulate airflow/waste airstream. This results in condensation of some of the gas phase pollutants (VOCs and sVOCs) contained in the waste airstream and their subsequent collection onto the stage I filter 120. Additionally, a small surplus of water, present on the stage I filter 120 as a thin film due to those fog droplets which have not evaporated before contacting the stage I filter 120, is used to effect removal, by solubilization and subsequent drainage, of any soluble and polar particle and gas phase pollutants that are in the waste airstream. Advanced oxidation processes (AOPs) are activated by injecting oxidants into the fog created by the fogger assembly 110, which serve to decompose the susceptible target compounds in the waste airstream.

Referring again to FIG. 1, pollution control system 100 includes a housing 102 which houses a series of filters between an inlet 104 and an outlet 170, at which an exhaust fan 180 creates an airflow path to discharge the commercial cooking exhaust (waste airstream) emitted from the commercial kitchen cooking ventilation hood to the outside atmosphere. The pollution control system 100 would be installed downstream of a commercial kitchen cooking ventilation hood (not shown for purposes of clarity).

The airflow contaminated with cooking emissions (i.e., waste airstream, shown by arrows in FIG. 1) may be subject to a fogger assembly 110 at inlet 104, in which fog nozzles 112 spray a plurality of monodisperse, 1 micrometer sized fog (minute water) droplets into the incoming airflow via the action of a pump 145 drawing from a cold water source. These monodisperse fog droplets mix with the air and evaporate to maximally reduce the waste airstream temperature. The reduction in temperature of the waste airstream can be 40 degrees F. or more. This in turn results in greater numbers of particulates being collected in all of the stages of the downstream filters 120, 140, 150. The effects of fogger assembly 110 will be explained in further detail hereafter.

The stage 1 filter 120 is a washable metal filter which filters out particles down to a size of 1 micrometer on a size-based (tested to ASTM 2519 and published) increasing efficiency. The stage I filter 120 has a reactor core (i.e. the center) which increases mixing of the waste airstream with the fog droplets resulting in optimized mechanical filtering principles to remove particle pollutants (such as grease and smoke) in the waste airstream, and optimized solubilization and removal by drainage into a drain 185 of soluble and polar particle and gas phase pollutants in the waste airstream, and dramatically increases the lifetime of the stage II filter 140 and the stage III filter by catching all the grease in the waste airstream. The entire solubilization process and the acceleration of the AOPs (which are initialized as soon as the activated ozone contacts the waste airstream) all take place within the reactor core (i.e., the interior) of the stage I filter 120 where the mixing is maximized. Any particle and gas phase pollutants (i.e., particulate matter, semivolatile and volatile organic compounds (sVOCs and VOCs)) that have not been removed from the waste airstream by the stage I filter 120 continue on into second annular space 125 to be filtered out by the stage II filter 140. The system 100 has slanted drain pans 103 both before and after the stage I filter 120 for proper drainage into the drain 185.

The stage II filter 140 removes particulate matter at a second smaller particulate cut size than the stage I filter 120. The stage II filter 140 can be comprised as a rigid type filter resistant to water vapor or a bag-type filter. Both filter types are rated MERV 15 in accordance with ASHRAE standard 52.2. Both filter types are proprietary with regards to their construction, moisture resistance, low pressure drop, and/or the stitching of a natural fiber material (such as wool) to a synthetic filter media which serves to both remove some VOCs as well as lengthen the life of the synthetic filter media. The airflow and any particles (including the condensed particle pollutants resulting from condensing a portion of the gas phase pollutants in the waste airstream via the fogging process), and gas phase pollutants such as sVOCs and VOCs not removed from the waste airstream by the stage II filter 140 continue on into second annular space 135 to be filtered out by a stage III filter 150.

The stage III filter is configured to remove sub-micron particles remaining in the waste airstream after passing through the stage II filter 140, including any condensed particle pollutants. The stage III filter 150 is constructed of a proprietary oil mist media which is rated at a 99 DOP efficiency (removes up to 99% of 0.3 micrometer-sized particulates) but results in a performance that is substantially at the level of a HEPA filter (99.97% removal of 0.3 micrometer-sized particles). However, this stage III filter 150 has a longer lifetime and costs significantly less than a HEPA filter. The airflow with any remaining submicron particulate matter and sVOCs and VOCs that has not been removed by the stage III filter 150 continue on into third annular space 155 to either be exhausted at outlet 170, or to be optionally filtered out by a stage IV filter 160 (filter bank(s)). Filter banks(s) in the stage IV filter 160 remove, by absorption, any remaining condensed particle pollutants and the gas phase pollutants. The stage IV filter 160 is included in system 100 if AOP is employed in the system 100, so as to remove any remaining unreacted ozone in the system (i.e., where VOC adsorption is required but atmospheric release of ozone is a concern).

The optional stage IV filter 160 (shown in dotted line to denote optional) is configured to remove, by adsorption, submicron particle and gas phase pollutants remaining in the waste airstream after passing through the stage III filter 150. The optional stage IV filter 160 may be a one or two pass filter system. The sorbents of the stage IV filter may be comprised of a proprietary sorbent, an activated charcoal sorbent, or a blend of the proprietary sorbent and activated charcoal. Each of these sorbents will be discussed in further detail hereafter.

Accordingly, during normal commercial cooking operations, the hot exhaust collected in the commercial kitchen cooking ventilation hood is ducted and drawn into the inlet 104 of system 100 by a UL 762 kitchen grease exhaust fan 180. The contaminated or waste airstream passes over stage I (120), stage II (140) and stage III (150) filters in sequence, and if included, a stage IV filter (160) consisting of one or two passes (one or two filter banks) of sorbent filters. Each filter in the first three filter stages I-III removes a size-dependent fraction of the particulate component of the exhaust (the other component in the waste airstream being gaseous, which would be removed by solubilization in the stage I filter, adsorption in the wool of the stage II filter and adsorption by the stage IV sorbent). All of the captured emissions are subject to decomposition via the AOP oxidation process. All particle removal efficiencies are described as MERV or DOP ratings according to ASTMF 2519, ASHRAE 52.2 or Military standard 282 respectively. For system 100, the respective efficiency ratings are as follows:

1. STAGE I—EFFICIENCY 58% @ 3 μm and 92% @ 5 μm (ASTM F 2519)
2. STAGE II—MERV 15 (ASHRAE 52.2) with an optional natural fiber layer stitched on
3. STAGE III—(95-99) DOP (Military standard 282)

After the cooking operations cease, the wash operation begins. The wash operation is performed to remove the grease accumulated on the stage I filter 120. The wash operation consists of opening wash and detergent solenoids by the wash control system (WCS) 195 and activating the detergent pump 175, also done from the WCS 195. As shown in FIG. 1, hot water with a specially formulated detergent 177 is pumped into the wash mechanism 130. The distance from the washing surface is carefully calculated to effect full coverage of the four square foot (2'×2') filter area of the stage I filter 120. The detergent 177 is allowed to soak and emulsify the accumulated grease on the filter 120 surface, after which a rinse cycle is commenced. Next, a five minute drip dry cycle is commenced. The system 100 has slanted drain pans 103 both before and after the stage I filter 120 for proper drainage into a drain 185. This wash and rinse cycle is then repeated. After these first two cycles are completed, the exhaust fan 180 is activated for one hour to dry the stage I filter 120.

Figure 4:
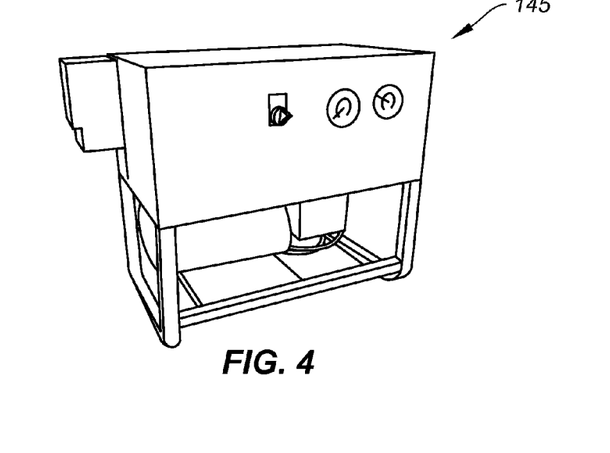
FIG. 4 is a picture of a pump used for the fogger assembly according to the example embodiment.

FIG. 2 is a front portional view of part of the pollution control system to show a fogger assembly in more detail; FIG. 3 is a plan view of an example high pressure nozzle installed on a collar that is positioned on a stainless steel tube according to the example embodiment; and FIG. 4 is a picture of a pump used for the fogger assembly 110 according to the example embodiment. Referring to FIGS. 2-4, the fogger assembly 110 utilizes the process of injecting a fine fog of monodisperse, equal-sized 1 micrometer aerosols (e.g., droplets) to effect evaporative cooling of the exhaust airstream. With this sized droplet, a maximal cooling of the waste airstream at the inlet 104 can occur. The temperature drop depends on the psychometric parameters of the airstream. Through this process of subjecting the incoming waste airstream emitted from the kitchen ventilation hood to the fog droplets sprayed therein from fogger assembly 110, three objectives may be achieved. First, there is maximal cooling of the waste airstream so as to condense out susceptible VOCs and sVOCs (gas phase pollutants) that have boiling points that are above the newly lowered psychometric airstream temperature due to the fog droplets evaporating in and cooling the waste airstream. These compounds condense into the solid phase and are subsequently removed by filtration. Second, by increasing the number of particles as described above, the particle sizes are grown through agglomeration and hence can be removed earlier and/or more easily cleaned by the stage I and II filters 120, 140. Third, by having an excess of fog droplets and a thin film of water on the surface of the stage I filter 120, the excess water resulting from those fog droplets which do not evaporate before contacting the stage I filter 120, this can effect solubilization of the highly and moderately polar compounds (I.e. polar particle and gas phase pollutants dissolvable in water) found in the emission profile, which are removed from system 100 via the drain 185. Accordingly, the fogger assembly 110 sprays a fog of monodisperse droplets to mix with the incoming waste airstream so as to achieve psychrometric saturation of the waste airstream, evaporative cooling of the airstream, and condensation of susceptible gas phase pollutants in the airstream (those gas phase pollutants having boiling points above the new lower temperature of the cooled waste airstream) into condensed particle pollutants that may be easily removed by the filters (stages I through IV).

To incorporate this technology, during standard filtering for cooking operations (i.e., during non-wash times), the fogger assembly 110 makes use of a high pressure pump 145 and a fog nozzle 112 configuration that generates a fog of equal-sized 1 micrometer fog droplets to exploit the physico-chemical properties of condensation and solubility to increase the total mass of emissions removed from the airstream by the stage I filter 120. The number of fog nozzles 112 utilized is calculated using psychometric principals and is specific to the cooking processes occurring under the kitchen hood and associated duct temperature.

The equipment includes a plurality of high-pressure fog nozzles 112 and a fogger pump 145, which may be a Micro-Cool pump for example. Three nozzles 112 are distributed vertically on each side of the air inlet 104 through vertical stainless steel tubing 114 and the MicroCool Rapid Orientation Collar (ROC) mounting system, which employs special collars 113 that slips over the tubing 114 and includes sealing rings that make a pressure tight seal against the outer wall of the tubing 114, permitting the nozzle 112 to be rotated thereon at any desired angle. Each nozzle 112 can be closed with an integral closure screw if necessary for psychometric reasons.

The vertical stainless steel tubing 114 is joined at the top of the inlet 104 outside of the housing 102 and then connected by additional stainless steel tubing to the fogger pump 145, which draws on the cold water source. The nozzles 112 are pointed so that their spray pattern 116 is directed into the incoming contaminated cooking exhaust air. A distance of four feet within housing 102 between the fogger assembly 110 and stage I filter 120 is utilized to effectively slow down the air and ensure that the fog droplets are evaporating and the waste airstream is reaching water vapor saturation and maximum evaporative cooling.

The fogger pump 145 is activated by a signal from the WCS 195 control panel and the cold water solenoid is opened from WCS 195. The function of the pump 145 is to maintain 1000 psi water pressure to the nozzles 112 by incorporating a variable frequency drive and pressure feedback loops. The droplet size of droplets in the fog is maintained at a consistent 1 micrometer size.

The frame on which the fogger pump 145 is mounted can accommodate up to two inline (in series) devices: a pH boosting device (shown as element 147 in FIG. 1) to boost the pH of the cold water source, and a diamond crystal ozone filter cartridge (shown as element 149 in FIG. 1) for generating dissolved ozone, to be discussed hereafter. The devices 147 and 149 thus comprise an Advanced Oxidation Process (AOP) dissolved gas generator 146. A provision is made for an inclusive reverse osmosis system for trouble-free nozzle longevity when AOPs are incorporated into the system.

The use of Advanced Oxidation Processes (AOPs) is an ideal approach to treat persistent water or air contaminants. AOPs can be understood as the combination of two or more processes to generate or increase the number of hydroxyl radicals (.OH). The hydroxyl radicals contribute to the oxidation of undesirable substances and have a considerably higher oxidation potential compared to other oxidants.

Once the fog droplets are evaporated the hydroxyl radicals and the activated ozone immediately react to decompose all susceptible oxidizable substances. The high degradation performance and the quick reaction kinetics of this process are the formula for success when it comes to eliminating numerous persistent substances.

Hydroxyl radicals are the foundational component of Advanced Oxidation Processes (AOPs). AOPs are initiated upon contact of activated ozone with the waste airstream so as to decompose particle and gas phase pollutants within the waste airstream in the air as well as in all of the filter stages I through IV. It is thus offered as an option for maximal odor control and filter life within system 100. It is offered as an option for both wash (with wash mechanism 130) and non-wash pollution control systems. For the system 100 with wash mechanism 130, it may be injected into the inlet 104 of the system 100 in one of two ways: namely as dissolved activated ozone for AOPs via the AOP dissolved gas generator 146 (comprising pH booster device 147, and the diamond crystal ozone cartridge 149 that generates the activated ozone (comprised of ozone gas with a surplus of hydroxyl radicals (.OH)) into the cold water source on its path to the fogging nozzles 112 of fogger assembly 110; or directly injected from a AOP free ozone gas generator 196 into the inlet 104 as activated ozone gas via an ozone gas injection device, shown in FIG. 1 as an ozone wand 190, for example. Either way, upon contact of the activated ozone with the waste airstream within system 100, AOPs which initiate therefrom serve to generate a set of oxidative cascade reactions that result in the destruction/decomposition of most of the organic compounds found in the cooking emissions (i.e., waste airstream). The reactivity of various organic compounds to undergo oxidation is well studied and reaction rates and orders well known. These susceptible compounds may be individual compounds that are in the airstream, absorbed or adsorbed on particles that have been captured on the stage I and II filters 120 and 140, or adsorbed onto the wool in the stage II filter 140 or sorbent filter bank(s) comprising the stage IV filter 160 (the latter is a requirement to utilize this technology when atmospheric dumping of fugitive or unused ozone in system 100 is a concern).

For ozone injection with the fogging assembly 110, such may be accomplished by installing the AOP dissolved gas generator 146, which comprises the pair of inline devices 147 and 149 as previously discussed, into the incoming cold water line. The pH booster 147 is designed to raise the pH of the filtered cold water source by adding liquid NaOH into the water, which increases the amount of OH ions in the water for subsequent generation of hydroxyl radicals for AOPs, so that a maximum amount of hydroxyl radicals (.OH) can be formed for the AOPs. The ozone cartridge 149 may be embodied as a Solid Synthetic Diamond Electrode cartridge and is provided to generate dissolved ozone gas to mix with the surplus hydroxyl radicals within the water so as to activate the dissolved ozone within the water. Upon evaporation during the evaporative cooling process (due to the fog droplets released by the nozzles 112 of the fogger assembly 110), the activated ozone is released to initiate AOPs, which generate oxidation of the organic compounds in the mixed air/fog waste stream and in all stages of the filters. For non-wash systems (i.e., systems without a wash mechanism 130), the activated ozone for AOPs can only be injected in gas form via the AOP free ozone gas generator 196 to the ozone wand 190, but is still highly effective.

Figures 5, 6, 7:
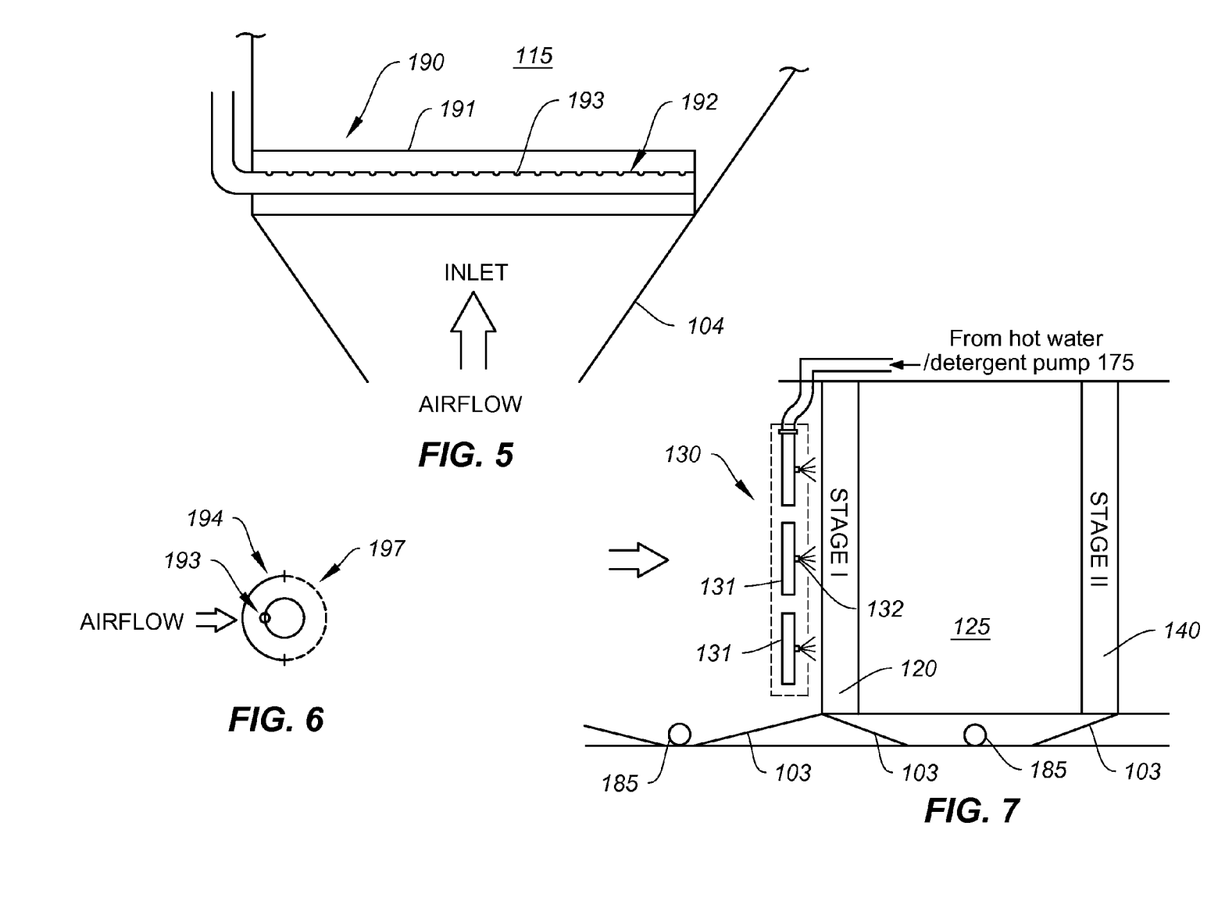
FIG. 5 is a front view of an ozone gas injection device according to an example embodiment.
FIG. 6 is an end view of the ozone gas injection device of FIG. 5.
FIG. 7 is a partial side view of the first and second stage filters to illustrate the wash mechanism in greater detail.

FIG. 5 is a front view of an ozone injection device according to an example embodiment; FIG. 6 is an end view of the ozone injection device of FIG. 5. System 100 is provided with an optional ozone injection device in the form of ozone wand 190. Wand 190 is configured to receive a source of ozone directly from an external source of ozone, for example, the AOP free ozone gas generator 196. In an alternative embodiment, another or second ozone injection device could be placed after the stage III filter 150; this is identified by injection point 191 in FIG. 1.

Referring to FIGS. 5 and 6, wand 190 is a double walled stainless steel tube that spans the inlet 104 to system 100 and consist of a "blind" solid metal half 194 that faces the dirty air and a perforated "open half" 197 that allows the ozone to leave the annular space 115 and enter the airstream. The inner tube 192, also made of stainless steel is a solid tube with a series of increasing hole diameters 193 designed to distribute the ozone evenly along the length of the tube and also to assure that the pressure ozone exceeds that of the ductwork static pressure at the inlet 104 of system 100. The weight of ozone delivered is calibrated based on the AOP free ozone gas generator 196 output and the distribution pressure in the inner tube 192 and external to it in the inlet 104. It is assumed that all ozone that leaves the inner tube 192 effectively enters the airstream through the outer half 194 blind tube.

The wash control system (WCS) 195 has many functions. As examples, some of the functions of the WCS 195 include, but are not limited to:

1) Start and stop the exhaust fan 180 (and remote supply fan if applicable);
2) Respond to a fire alarm condition by releasing fire suppression chemical and if desired, water into the system 100, shutting off remote supply fan and activating (if not already on) the exhaust fan 180;
3) Control the wash cycle by activating the hot water solenoid, detergent pump 175, and exhaust fan 180 in accordance with the wash cycles described below:
   a. 2 minute fan shutdown,
   b. 30 second pre wash hot water warm up,
   c. 2 minute wash with detergent,
   d. 1 minute rinse,
   e. 5 minute drip dry and drain,
   f. Repeat step c thru e, and
   g. 60 minute forced air dry;

4) Signal to activate the fogger assembly 110 solenoid and fogger pump 145, if included as an option; and 5) Signal to energize the ozone filter cartridge 149 of AOP dissolved gas generator 146, if included as an option.

FIG. 7 is a partial side view of the first and second stage filters to illustrate the wash mechanism in greater detail; FIG. 8 is a perspective view of the looping manifold and nozzles of the wash mechanism in relation to the first stage filter. Referring to FIGS. 7 and 8, the wash mechanism 130 is comprised of a looping copper manifold 131 which includes a plurality of fixed nozzles 132. Nozzles 132 are full conical high pressure spray nozzles As best shown in FIG. 8, the stage I filter 120 may comprise a metal frame 121 which retains a plurality of stacked filter coil pack reactors 122 ("coil packs") therein. Three coil packs 122 are shown in FIG. 8, although two may be sufficient depending upon CFM requirements. The "s" or serpentine shape of the manifold 131 provides three nozzle rows, each row containing a set of three equally-spaced nozzles 132 to spray a mixture of hot water and detergent 177 (via detergent pump 175) onto the surface of each of the three coil packs 122 of filter 120. This nozzle configuration is only exemplary; different combinations of nozzles 132 may be used so long as the water-detergent spray is evenly distributed on the surfaces of the coil packs 122. As previously noted, the distance of the wash mechanism 130 from the washing surfaces of the stage I filter 120 is carefully calculated to effect full coverage of the four square foot (2'×2') filter area of the stage I filter 120.

Figure 9:
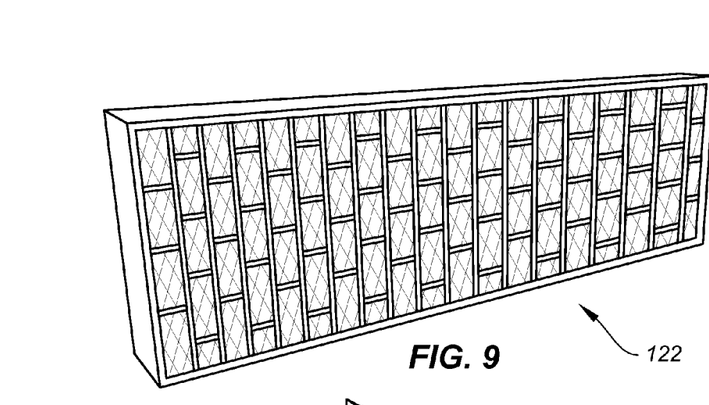
FIG. 9 is an example coil pack used in a stage I filter according to an example embodiment.
Figure 10:
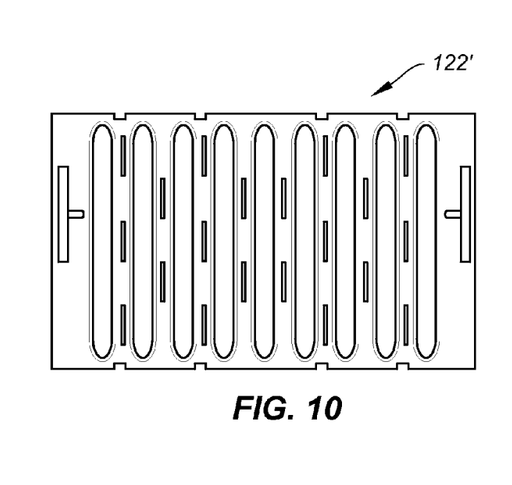
FIG. 10 is another style of stage I filter according to an example embodiment.

FIG. 9 is an example coil pack reactor used in one type of a stage I filter according to an example embodiment. FIG. 10 is another and different style of stage I filter called the Cascade Filter with the reactor being the space within the filter and the air directed there by small slots. Both filters are nominally two inches thick and fit into a 2 inch filter track with weep holes to allow the removed grease to drain to the sump.

The first example filter for use as the stage I filter 120 is the Veritech® filter, with its plurality of stainless-steel coil packs 122 (2 or 3 coil packs depending on the air volume). The Veritech filter is a stainless steel coil pack filter which has a higher collection efficiency (a 60% removal for particle size 3 microns) than an alternative stage I filter type referred to as the Cascade filter, and a greater surface area for solubility interaction. The coil pack 122 is shown in FIG. 9 and several of these coil packs (two or three coil packs in vertical relation, depending on the CFM requirement) are stacked in a typical installation into a metal filter frame 121 (FIG. 8) to be installed as a stage I (24"×24"×2") filter 120. The reactor (i.e., interior) within the coil packs 122 of the Veritech filter is where the extensive mixing and solubilization of the polar compounds found in the waste airstream occurs entirely and where the advanced oxidation processes (AOPs) are accelerated via extensive mixing, and where the final degree of the condensation takes place as well. Accordingly, the use of a Veritech filter as the stage I filter 120 is desirable so that, maximum solubilization, maximum chance of oxidation of compounds, and maximum temperature drop in the waste airstream can occur, (i.e., mixing within the reactors of the coil packs 122 to enhance, solubility, oxidation and evaporative cooling).

The Veritech filter coil pack is disclosed and described in EP0857508 to Van Nierkirk, published Aug. 12, 1998 (filed Oct. 2, 1998) and entitled "Separation Apparatus", the entire contents of which are hereby incorporated by reference herein. An alternative filter for stage I is built off the coil pack 122' shown in FIG. 10, which is offered by Franke® as the Cascade™ grease filter. This filter has a 50% removal efficiency for particle size 5 micrometers. The Franke® Cascade™ grease filter coil pack is disclosed and described in U.S. Patent Appl. Pub. No. 20120247074 to Chmayssani et al., published Oct. 4, 2012 (filed Mar. 29, 2012) and entitled "Double Helix Grease Filter", the entire contents of which are hereby incorporated by reference herein.

Figure 11:
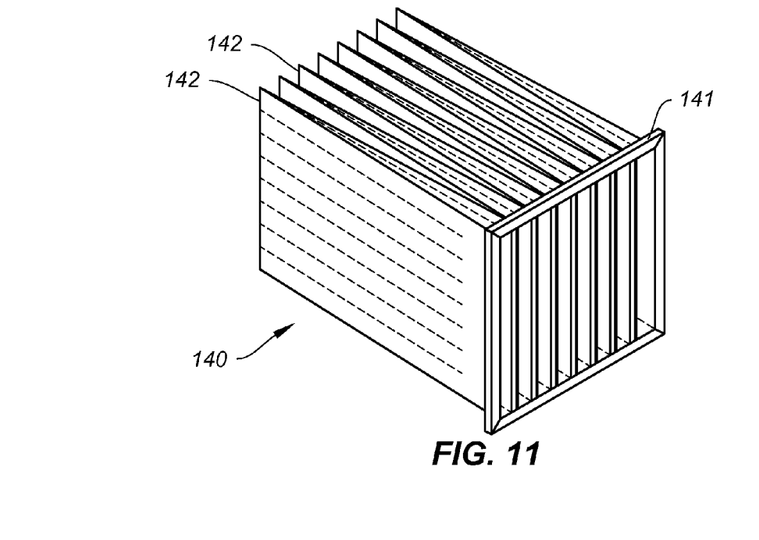
FIG. 11 is a perspective view of a stage II filter according to an example embodiment.
Figure 12:
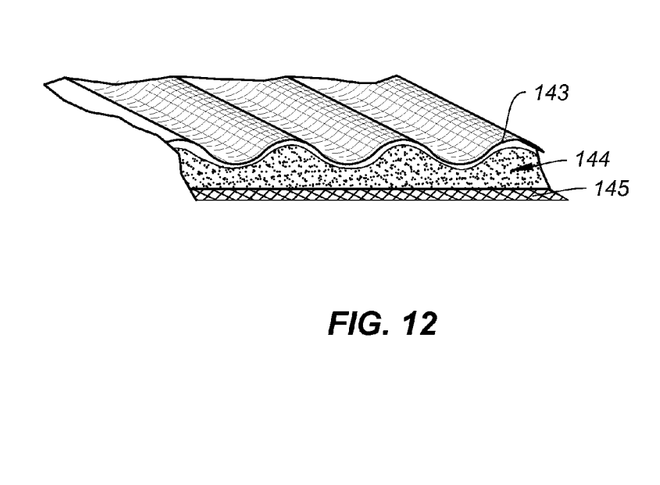
FIG. 12 shows a cross-section of the stage II filter of FIG. 11 to illustrate material components thereof.

FIG. 11 is a partial front view of a stage II filter according to an example embodiment, and FIG. 12 is a cross-section of the stage II filter of FIG. 11 showing material components thereof. Referring to FIGS. 11 and 12, the stage II filter 140 is provided by Safe Air Service, LLC. Stage II filter 140 has a one-inch header 141 and a filter bag body designed as a plurality of pleats 142. Specifically, the stage II filter 140 consists of a double layer stitched media bag filter with a one inch header. FIG. 12 shows the material used to make the filter 140 of FIG. 11. The material includes a natural fiber which in one example is a proprietary wool layer 143, which is attached (such as by stitching, heat sealing and/or adhesives) onto a MERV 15 synthetic media 144, which in turn is attached to material which forms the outer surface 145 of the filter 140. Wool is a hydrophilic in nature and this facilitates gas (VOC) removal by adsorption. A natural fiber such as wool also serves to wick any accumulated grease particles that have passed through the stage I filter 120 away from the MERV 15 synthetic media 144 so as to significantly enhance the stage II filter 140's replacement lifetime. Accordingly, incorporation of a wool layer 143 on top of the MERV 15 synthetic media 144 in the stage II filter 140 allows the filter 140 to now remove and retain a portion of the gases (VOCs) therein.

Another possible embodiment for the stage II filter 140 is a customized MERV 15 box filter. This box filter is designed for a smaller unit and features a very low pressure drop as well as a high resistance to moisture.

Figure 13:
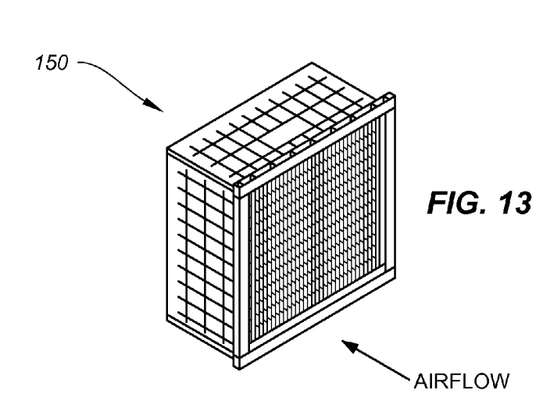
FIG. 13 is a perspective front view of a stage III filter according to an example embodiment.
Figure 14:
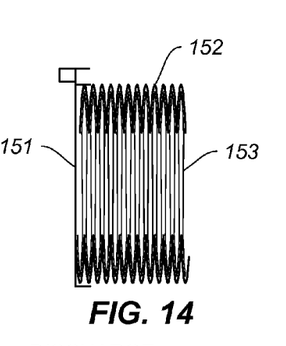
FIG. 14 is a cross-section of the stage III filter internals of FIG. 13.

FIG. 13 is a perspective front view of a stage III filter according to an example embodiment, and FIG. 14 is a cross-section of the stage III filter internals of FIG. 13. Referring to FIGS. 13 and 14, the fiber cross-section of the stage III filter 150 includes a high-impact plastic frame 151, a bead separator 152 and synthetic media 153, which is an oil-mist media. This provides an embossed oil mist media with adhesive bead separators, known as an "E-Pleat" technology pleat pack which is generally water resistant. The stage III filter 150 is unique in that it does not allow water to penetrate the filter and thus could be washed in another embodiment of the system 100. This stage III filter 150 is disclosed and described in FIGS. 33-34 of U.S. Pat. Appl. Pub. No. 20120317940 to Ball et al., published Dec. 20, 2012 (filed May 24, 2012) and entitled "Non V-Bank Filter For Animal Confinement Facility", the entire contents of the application being incorporated by reference herein. The stage III filter 150 is constructed with a specialized oil mist media. This unique filter media was screened and tested under the South Coast Air Quality Management District (SCAQMD) PAR 1138 testing protocol and demonstrated to be as efficient as a comparative HEPA filter under real world char broiling of 20% fat hamburgers. The stage III filter 150 with oil-mist media has a 99 DOP rating. Due to the natural attraction of the oil-mist media to the oily composition of the bulk of the cooking emissions; this filter removes approximately the same amount of particulate as a glass HEPA filter rated at 99.97%.

The stage IV filter 160 (filter bank(s)) is configured to remove, by adsorption, any condensed particle and gas phase pollutants remaining in the waste airstream after passing through the stage III filter 150. The stage IV filter 160 (filter bank(s)) is used when VOC adsorption is required (and mandated when ozone is injected into the system 100, which needs to be quenched prior to exiting outlet 170 to the atmosphere) and may be either 2-inch flat panels arranged in a "V" configuration" or arranged in V-shaped cassettes, or, when a double pass configuration is chosen, the flat panels and the cassettes. The weight range for either of these is 12-25 pounds for service convenience. One sorbent material to be used in these filter bank(s) may be composed of a new proprietary sorbent called TechZorb-RH. TechZorb-RH is a hydrophobic synthetic zeolite which is specifically compounded to function well in high humidity environments (such as a fog environment), and removes VOCs by adsorption in the high relative humidity environment. In an example (within a fog environment) where the stage IV filter 160 is configured as a two pass system, the first pass filter may include the TechZorb-RH as the sorbent and the second pass filter may include activated charcoal as the sorbent.

A variation of TechZorb has been developed for non-fogging systems (where fogger assembly 110 is not employed). Typically, a stage IV filter 160 in this configuration may be a two-pass configuration (first pass filter including TechZorb as the sorbent, second pass filter having activated charcoal as the sorbent. This TechZorb variation is also a hydrophobic synthetic zeolite, but it is formulated for lower humidity and higher adsorption capacity to catch the fraction of the VOCs that the activated charcoal does not catch (in a non-fog environment).

Two passes of sorbent for the stage IV filter 160 assure greater odor reduction and halves the frequency of replacement, and is recommended for freestanding units, as opposed to self-contained re-circulating units (ventless hoods), as space does not allow this configuration. When a double pass configuration (2 filters in series) of sorbents is used (and recommended to quench any fugitive ozone), a second pass of bonded carbon panels is recommended.

Figures 15, 16:
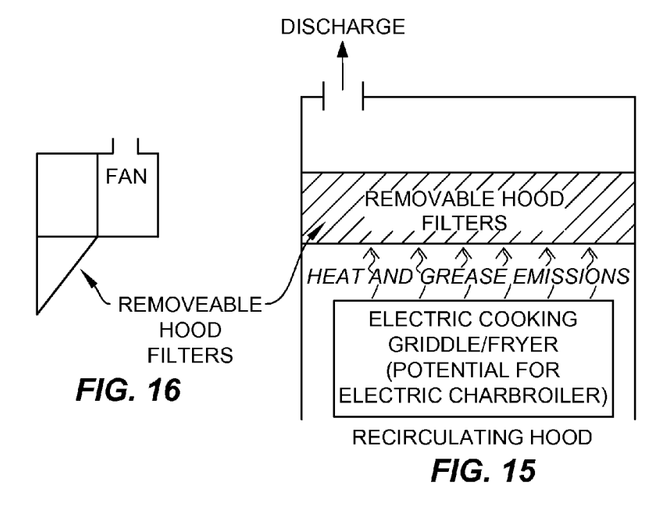
FIG. 15 is a drawing of a recirculating (ventless) kitchen exhaust hood.
FIG. 16 is a side view of the drawing of FIG. 15.
Figure 17:
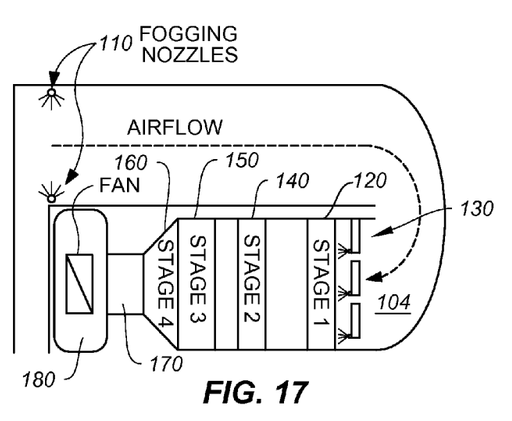
FIG. 17 is a block diagram of a pollution control system according to an example embodiment configured for the recirculating (ventless) kitchen exhaust hood of FIGS. 15 and 16.

FIG. 15 is a drawing of a recirculating (ventless) kitchen exhaust hood, FIG. 16 is a side view of the drawing of FIG. 15, and FIG. 17 is a block diagram of a pollution control system according to an example embodiment configured for the recirculating (ventless) kitchen exhaust hood of FIGS. 15 and 16. Another application for the removal of cooking emissions involves the use of the same filtration technologies in what is termed a recirculating hood. Here, the exhaust collected over non-gas cooking appliances are run through a series of filters and then discharged back into the kitchen space. One distinct and tremendous advantage of this technology is that the dramatic cooling of the hot exhaust air (by fogger assembly 110) allows the technology to be listed for electric char broilers.

Referring to FIGS. 15 through 17, all of the above described technologies can be implemented in the aforementioned ventless recirculating hood device. These consist of a regular kitchen exhaust hood (FIG. 15) that has a filtration mechanism (FIG. 17) contained in the housing above the hood filters shown in FIGS. 15 and 16 and that discharges the air back into the kitchen space after filtering it. A miniaturized version of the fogger pump 145 has been developed for this application, although not shown for reasons of brevity.

Again, the described technologies lead to reduced filter cost and more efficient filtration through fogging and ozone introduction. Inclusion of one inch activated charcoal sorbent panels 160 is mandatory to eliminate fugitive ozone from entering the indoor kitchen space. These recirculating hoods must pass a specific UL 710B standard to certify that they achieve the required particulate emission reduction. Also, these hoods are never used for gas-fired appliances since they represent a risk of carbon monoxide poisoning.

Figure 18:
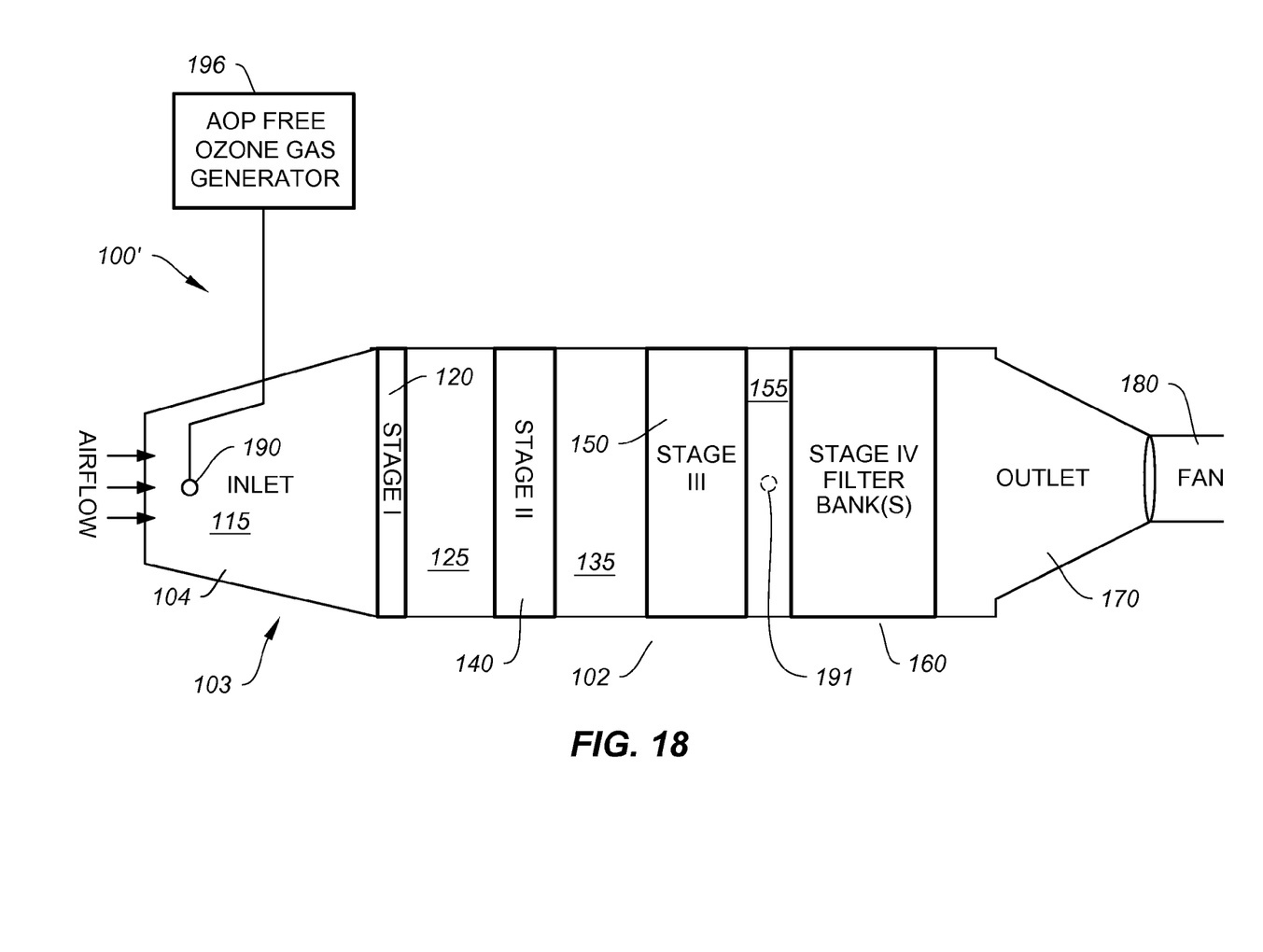
FIG. 18 is a block diagram of a mechanical filter-based pollution control system according to another example embodiment.

FIG. 18 is a block diagram of a mechanical filter-based pollution control system according to another example embodiment. FIG. 18 includes many of the same components as in FIG. 1; thus only the differences are discussed in detail. FIG. 18 illustrates a system 100' without a fogger assembly 110 and without a wash mechanism 130. As there is no filter washing, the stage I filter 120 may be composed of a less expensive disposable synthetic media for filtering grease and particles in the waste airstream. An example may be a synthetic filter with an efficiency rating of MERV 6-10. The efficiency of the stage I filter 120 is selected so as to approximate the same filter change frequency as that of the stage II filter 140 (so they can be replaced at the same time). The stage II filter 140 may have the same construction as in FIG. 1, a wool layer attached to a MERV 15 synthetic media for removing particle and gas phase pollutants remaining in the waste airstream after passing through the first stage filter 120. The stage III and IV filters 150, 160 may also be similar as described with respect to FIG. 1, where the stage III filter includes an oil-mist media therein for removing sub-micron particle pollutants remaining in the waste airstream after passing through the stage II filter, and where the stage IV filter 160 removes, by adsorption, sub-micron particle and gas phase pollutants remaining in the waste airstream after passing through the stage III filter 150.

In this embodiment, since there is no fogger assembly 110 and no wash mechanism 130, the means to inject activated ozone within the housing to initiate AOPs upon contact with the waste airstream, so as to decompose particle and gas phase pollutants of the waste airstream in the first through fourth stage filters, is met by incorporating the AOP free ozone gas generator 196 and an ozone injection device such as ozone wand 190 into system 100'. The activated ozone for AOPs can only be injected in gas form via the AOP free ozone gas generator 196 to the ozone wand 190.

Accordingly, the pollution control system 100 as heretofore described employs ozone in advance oxidation processes (AOPs) to maximize the number of hydroxyl radicals generated, so as to decompose particles trapped in filter stages I-IV, to decompose solubilized VOCs (gas pollutants) through mixing in the stage I filter 120, to decompose adsorbed VOCs trapped in the wool layer 143 of the stage II filter 140, and to decompose any remaining VOCs adsorbed in the stage IV filter 160.

The stage II filter 140 with its wool layer 143 can lengthen the life of the stage IV filter 160 sorbent because some VOCs that normally would reach the stage IV sorbent can actually be adsorbed and held in the wool of the stage II filter 140. This segregation also facilitates greater oxidative destruction of all adsorbed gas phase pollutants via AOPs in both locations because of the lesser density of adsorbed compounds spread through the total volume of media or sorbent (i.e., the volume of wool fibers in the stage III filter 140 and the volume of the sorbent material in the stage IV filter 160)). Further, the stage III filter 150 enhances oxidative destruction of adsorbed particles because of the greater amount of smaller particles that are retained. Specifically, its oil-mist media increases the efficiency of the filter 150, so as to remove approximately the same amount of particulate as a glass HEPA 99.97 filter, due to the attraction of the oil-mist media to the emission compound (oil).

Yet further, a pollution control system 100 including a combination of the fogger assembly 110, stage II filter 140 having the wool/synthetic media material construction, and stage III filter 150 with the oil-mist media substantially reduces filter replacement costs while maximizing emission removal.

The example embodiments being thus described, it will be obvious that the same may be varied in many ways. Such variations are not to be regarded as departure from the example embodiments, and all such modifications as would be obvious to one skilled in the art are intended to be included in the following claims.

I claim:

1. A mechanical filter-based air pollution control system for removing particle and gas phase pollutants in a waste airstream exhausted from commercial cooking operations, comprising:
   a housing having an inlet and an outlet,
   an exhaust fan attached to the outlet for drawing the waste airstream into the inlet and through the housing to the outlet and discharging to the outside atmosphere,
   a fogger assembly arranged within the housing at the inlet and connected to a cold water source for spraying equal-sized 1 micrometer droplets to mix with the incoming waste airstream so as to achieve psychrometric saturation of the waste airstream, evaporative cooling of the airstream, and condensation of a portion of gas phase pollutants in the waste airstream into condensed particles,
   a first stage metal filter arranged within the housing and downstream of the fogger assembly for filtering particle pollutants, and solubilizing and removing by drainage polar particle and gas phase pollutants in the waste airstream,
   a second stage filter arranged within the housing and downstream of the first stage filter, the second stage filter including a wool layer attached to a MERV 15 synthetic media therein for removing particles, including the condensed particles, and gas phase pollutants remaining in the waste airstream after passing through the first stage filter, and
   a third stage filter arranged within the housing and downstream of the second stage filter, the third stage filter including an oil-mist media therein for removing sub-micron particle including the condensed particle pollutants remaining in the waste airstream after passing through the second stage filter.

2. The system of claim 1, further comprising:
   a wash mechanism arranged in the housing in facing relation to a front of the first stage filter, the wash mechanism including a manifold supporting a plurality of spray nozzles thereon, the manifold supplying a mix of heated water from a hot water source and detergent to the nozzles for periodically washing surfaces of the first stage filter to remove grease therefrom.

3. The system of claim 1, further comprising:
   a fourth stage filter arranged within the housing and downstream of the third stage filter for removing, by adsorption, condensed particle and gas phase pollutants remaining in the waste airstream after passing through the third stage filter.

4. The system of claim 3, wherein the fourth stage filter is configured as a two pass filter system, the first pass filter including a sorbent composed of a hydrophobic synthetic zeolite compounded to be effective in high humidity, and the second pass filter including activated charcoal as the sorbent.

5. The system of claim 3, wherein the fourth stage filter is configured as a single pass filter system, the filter having a sorbent including a blend of hydrophobic synthetic zeolite and activated charcoal.

6. The system of claim 3, further comprising:
   injection means to inject activated ozone, which comprises ozone with a surplus of hydroxyl radicals, within the housing to initiate advanced oxidation processes (AOPs) upon contact of the activated ozone with the waste airstream so as to decompose particle and gas phase pollutants within the waste airstream and retained in the first through fourth stage filters.

7. The system of claim 6, wherein the injection means for injecting ozone includes an AOP dissolved gas generator which comprises a pH boosting device for raising the pH of a cold water source supplied thereto to increase an amount of OH ions in the water for subsequent generation of hydroxyl radicals for AOPs, and a ozone filter cartridge in series with the pH boosting device for generating dissolved ozone that mixes with the raised-pH water to create activated ozone, the water with activated ozone being injected into the fogger assembly to produce droplets that initiate the AOPs.

8. The system of claim 1, wherein the portion of the gas phase pollutants condensed into condensed particle pollutants are those gas phase pollutants having a boiling point greater than the cooled waste airstream temperature.

9. A mechanical filter-based air pollution control system for removing particle and gas phase pollutants in a waste airstream exhausted from commercial cooking operations, comprising:
   a housing having an inlet and an outlet,
   an exhaust fan attached to the outlet for drawing the waste airstream into the inlet and through the housing to the outlet and discharging to the outside atmosphere,
   a disposable, synthetic first stage filter with an efficiency rating of MERV 6-10 for filtering particles in the waste airstream,
   a second stage filter arranged within the housing and downstream of the first stage filter, the second stage filter including a wool layer attached to a MERV 15 synthetic media therein for removing particle and gas phase pollutants remaining in the waste airstream after passing through the first stage filter,
   a third stage filter arranged within the housing and downstream of the second stage filter, the third stage filter including an oil-mist media therein for removing sub-micron particle pollutants remaining in the waste airstream after passing through the second stage filter,
   a fourth stage filter arranged within the housing and downstream of the third stage filter for removing, by adsorption, sub-micron particle and gas phase pollutants remaining in the waste airstream after passing through the third stage filter, and
   injection means to inject activated ozone, which comprises ozone with a surplus of hydroxyl radicals, within the housing to initiate advanced oxidation processes (AOPs) upon contact of the activated ozone with the waste airstream so as to decompose particle and gas phase pollutants within the waste airstream and retained in the first through fourth stage filters,
   wherein the fourth stage filter quenches any fugitive or unused ozone remaining in the system.

10. The system of claim 9, wherein the injection means for injecting ozone includes an AOP free gas generator external to the housing which generates ozone gas and is connected to an ozone injection device arranged within the housing at the inlet, the ozone gas injected directly into the waste airstream at the inlet via the ozone injection device.

11. The system of claim 9, wherein the fourth stage filter is configured as a two pass filter system, the first pass filter including a sorbent composed of a hydrophobic synthetic zeolite and the second pass filter including activated charcoal as the sorbent.

12. The system of claim 9, wherein the fourth stage filter is configured as a single pass filter to include a sorbent composed of a blend of a hydrophobic synthetic zeolite and activated charcoal.

13. The system of claim 12, wherein the hydrophobic synthetic zeolite sorbent is compounded to catch a fraction of the gas phase pollutants that the activated charcoal sorbent does not catch.

14. A mechanical filter-based air pollution control system for removing particle and gas phase pollutants in a waste airstream exhausted from commercial cooking operations, comprising:

a housing having an inlet and an outlet, an exhaust fan attached to the outlet for drawing the waste airstream into the inlet and through the housing to the outlet and discharging to the outside atmosphere, a fogger assembly arranged within the housing at the inlet and connected to a cold water source for spraying fog droplets to mix with the incoming waste airstream so as to condense gas phase pollutants in the airstream to condensed particles, a first stage metal filter arranged within the housing and downstream of the fogger assembly for filtering particle pollutants, and solubilizing and removing by drainage polar particle and gas phase pollutants in the waste airstream, a wash mechanism arranged in the housing in facing relation to a front of the first stage filter, the wash mechanism including a manifold supporting a plurality of spray nozzles thereon, the manifold supplying a mix of heated water from a hot water source and detergent to the nozzles for periodically washing surfaces of the first stage filter to remove grease therefrom, a second stage filter arranged within the housing and downstream of the first stage filter for removing particle and gas phase pollutants remaining in the waste airstream after passing through the first stage filter, a third stage filter arranged within the housing and downstream of the second stage filter for removing sub-micron particle including condensed particle pollutants remaining in the waste airstream after passing through the second stage filter, a fourth stage filter arranged within the housing and downstream of the third stage filter for removing, by adsorption, condensed particles and gas phase pollutants remaining in the waste airstream after passing through the third stage filter, and injection means to inject activated ozone within the housing, which comprises ozone with a surplus of hydroxyl radicals, to initiate advanced oxidation processes (AOPs) upon contact of the activated ozone with the waste airstream so as to decompose particle and gas phase pollutants within the waste airstream and retained in the first through fourth stage filters, wherein the fourth stage filter quenches any fugitive or unused ozone remaining in the system.

15. The system of claim 14, wherein the first stage filter filters particle pollutants in the waste airstream including grease and smoke down to a 1 micrometer size.

16. The system of claim 14, wherein the fog droplets are equal-sized 1 micrometer droplets.

17. The system of claim 14, wherein the second stage filter includes a wool layer attached to a MERV 15 synthetic media therein.

18. The system of claim 14, wherein the third stage filter includes an oil-mist media therein.

19. The system of claim 14, wherein the fourth stage filter is configured as a two pass filter system, the first pass filter including a sorbent composed of a hydrophobic synthetic zeolite and the second pass filter including activated charcoal as the sorbent.

20. The system of claim 14, wherein the injection means for injecting ozone includes an AOP dissolved gas generator which comprises a pH boosting device for raising the pH of a cold water source supplied thereto to increase an amount of OH ions in the water for subsequent generation of hydroxyl radicals for AOPs, and a ozone filter cartridge in series with the pH boosting device for generating dissolved ozone that mixes with the raised-pH water to create activated ozone, the water with activated ozone being injected into the fogger assembly to produce droplets that initiate the AOPs.

* * * * *